United States Patent [19]

Land

[11] Patent Number: 5,620,492

[45] Date of Patent: Apr. 15, 1997

[54] APPARATUS FOR QUENCHING GLASS

[76] Inventor: Michael B. Land, 2 Tranter Avenue, Alvechurch, Birmingham, B48 7PH, England

[21] Appl. No.: 596,165

[22] PCT Filed: Aug. 5, 1993

[86] PCT No.: PCT/GB93/01664

§ 371 Date: Jan. 30, 1996

§ 102(e) Date: Jan. 30, 1996

[87] PCT Pub. No.: WO95/04708

PCT Pub. Date: Feb. 16, 1995

[51] Int. Cl.[6] .................................... C03B 27/00
[52] U.S. Cl. ...................... 65/348; 65/351; 65/115; 239/DIG. 7
[58] Field of Search .................. 239/DIG. 7; 65/348, 65/351, 115

[56] References Cited

U.S. PATENT DOCUMENTS

| 3,607,173 | 9/1971 | McMaster et al. ................ 65/25 |
| 3,743,186 | 7/1973 | Mocarski ...................... 239/413 |
| 3,890,063 | 6/1975 | Spafford ....................... 417/27 |
| 4,059,427 | 11/1977 | Starr et al. .................... 65/25 |
| 4,336,442 | 6/1982 | Starr .......................... 219/400 |
| 4,867,380 | 9/1989 | Sibbertsen ..................... 239/405 |
| 5,334,234 | 8/1994 | Anttonen et al. ................ 65/351 |
| 5,407,135 | 4/1995 | Jeffs .......................... 239/288 |

FOREIGN PATENT DOCUMENTS 6-238198  8/1994  Japan ................ 239/DIG. 7

Primary Examiner—Donald E. Czaja
Assistant Examiner—Jacqueline A. Ruller
Attorney, Agent, or Firm—Schweitzer Cornman & Gross

[57] ABSTRACT

Quenching apparatus (12) for use in glass heat treatment apparatus comprises a plurality of air flow amplifiers (32) carried on manifolds (26, 28) and arranged in arrays to direct cooling air onto both surfaces of glass (16) being treated. Compressed air is supplied to the manifolds (26, 28) from air receivers (22) charge by a compressor (20) the compressed air flow being controlled by a control valve (24). Air flow received by the air flow amplifiers (32) from the manifolds (26, 28) is amplified to supply a flow of cooling air directed towards the sheet of glass (16). The air flow amplifiers (32) may be air ejectors. A furnace (10) is provided to heat the glass (16) and a conveyor is provided to carry the glass (16) from the furnace (10) to the quenching apparatus.

9 Claims, 3 Drawing Sheets

APPARATUS FOR QUENCHING GLASS

The present invention relates to thermal treatment of glass.

As is well-known, a sheet of glass may be toughened by heating it until it reaches its transition temperature and then cooling it rapidly. The most commonly used method of cooling is air quenching, in which a large quantity of turbulent cooling air is blown onto each surface of the sheet. The quantity of air must be large enough to create a steep temperature gradient between the surfaces and the median plane of the sheet so that the glass cools inwardly from its surfaces to its median plane. This causes stresses to be set up within the sheet, as it cools, such stresses having a beneficial effect on the toughness of the glass.

Conventional glass toughening apparatus comprises quenching apparatus in which the air required to quench the glass is provided by a large fan which generates a stream of air of high volume but low pressure. The air stream is typically carried by ducts to plenum chambers mounted adjacent both surfaces of a sheet of glass to be toughened. The plenum chambers have jets from which the air issues and impinges on the sheet of glass. The fan is typically driven by an electric motor.

A major disadvantage with such known quenching apparatus is that the power consumption of the fan is typically very large. For example, in a typical apparatus for toughening architectural glass, the power required to drive the fan may be as high as 700 kW. Such high power consumption not only makes the plant expensive in use, but also makes installation expensive, special provision often being necessary to supply the required electrical power. Furthermore, the required fan and its associated ducting are often very large.

Quenching apparatus is also known, from GB-A-2 185 476, which provides quenching air from a body of compressed air contained within an air receiver. A compressor supplies air to the receiver, the receiver being connected to a plenum having jets as described above through a closable valve. A sheet of glass to be quenched is placed adjacent the jets, and the valve is opened. This results in a rush of air into the plenum and then out of the jets to quench the glass. A disadvantage with this system is that the compressor must supply the entire of volume of air required to quench the glass, and is consequently large, expensive, and power-hungry.

It is the aim of the present invention to provide apparatus for quenching glass which overcomes or at least ameleorates the disadvantages of known apparatus.

According to a first aspect of the invention there is provided apparatus for quenching a sheet of glass undergoing heat treatment comprising a source of compressed air, a plurality of air flow amplifiers adapted to receive from the source of compressed air a flow of compressed air and to amplify that flow to provide a flow of cooling air for quenching the sheet of glass.

The large flow of air required to quench the glass can be generated by such apparatus from only a comparatively small flow of compressed air. The compressed air source can, therefore, be of smaller size then would be the case if it had to supply all of the quenching flow.

The air amplifiers are preferably arranged in an array to provide multiple air streams distributed over a surface of the sheet of glass to be quenched. More preferably, the apparatus comprises two of such arrays each arranged to direct air onto a respective surface of the sheet of glass.

Each air flow amplifier may comprise an air ejector. Such devices have been found to provide a particularly advantageous amplification of air flow. The air amplifiers may be individually adjustable such that the volume of cooling air produced thereby may be controlled. By this arrangement, the volume of air applied to quench the sheet of glass may be varied from one region of the sheet to another, so allowing the degree of toughening (and therefore the fracture properties) of the glass to be varied across the sheet.

Typically, the apparatus further comprises air distribution means for conducting air from the source of pressure air to the air amplifiers. Preferably, the distribution means comprises a manifold on which air amplification means are mounted. In embodiments where the amplification means are arranged in an array, there may be provided a plurality of spaced-apart manifolds, each carrying a row of amplification means.

The distribution means typically further comprises a flow-control valve operable to control the flow of air from the source of compressed air, and the pressure of air supplied to the air amplifiers. A pressure transducer may be provided within the manifold to provide pressure feedback information to the control unit.

The source of compressed air may comprise a compressor and an air receiver, and may further comprise air drying and air filtering means.

In a second of its aspects, the invention provides apparatus for heat toughening of a sheet of glass comprising heating means for heating a sheet of glass, to its transition point, quenching apparatus according to the first aspect of the invention, and conveying means for conveying a sheet of glass from the heating means to the quenching apparatus.

The apparatus may further comprise a secondary cooling unit to cool a sheet of glass to a temperature at which it may be handled following the toughening operation. The secondary cooling unit may comprise a fan to provide a flow of cooling air. The secondary cooling unit may be incorporated into the quenching apparatus and may discharge its air through the air flow amplifies. Alternatively, it may be a separate unit into which the glass passes following quenching.

In a third of its aspects, the invention provides a method of operating apparatus according to the second aspect of the invention in which a compressor stores compressed air in an air receiver during such time as a sheet of glass is being heated by the heating means, the sheet of glass then being conveyed to the quenching means to which is fed the compressed air stored in the air receiver to quench the sheet of glass.

An embodiment of the invention will now be described in detail by way of example with reference to the accompanying drawings, in which.

Figure 1:
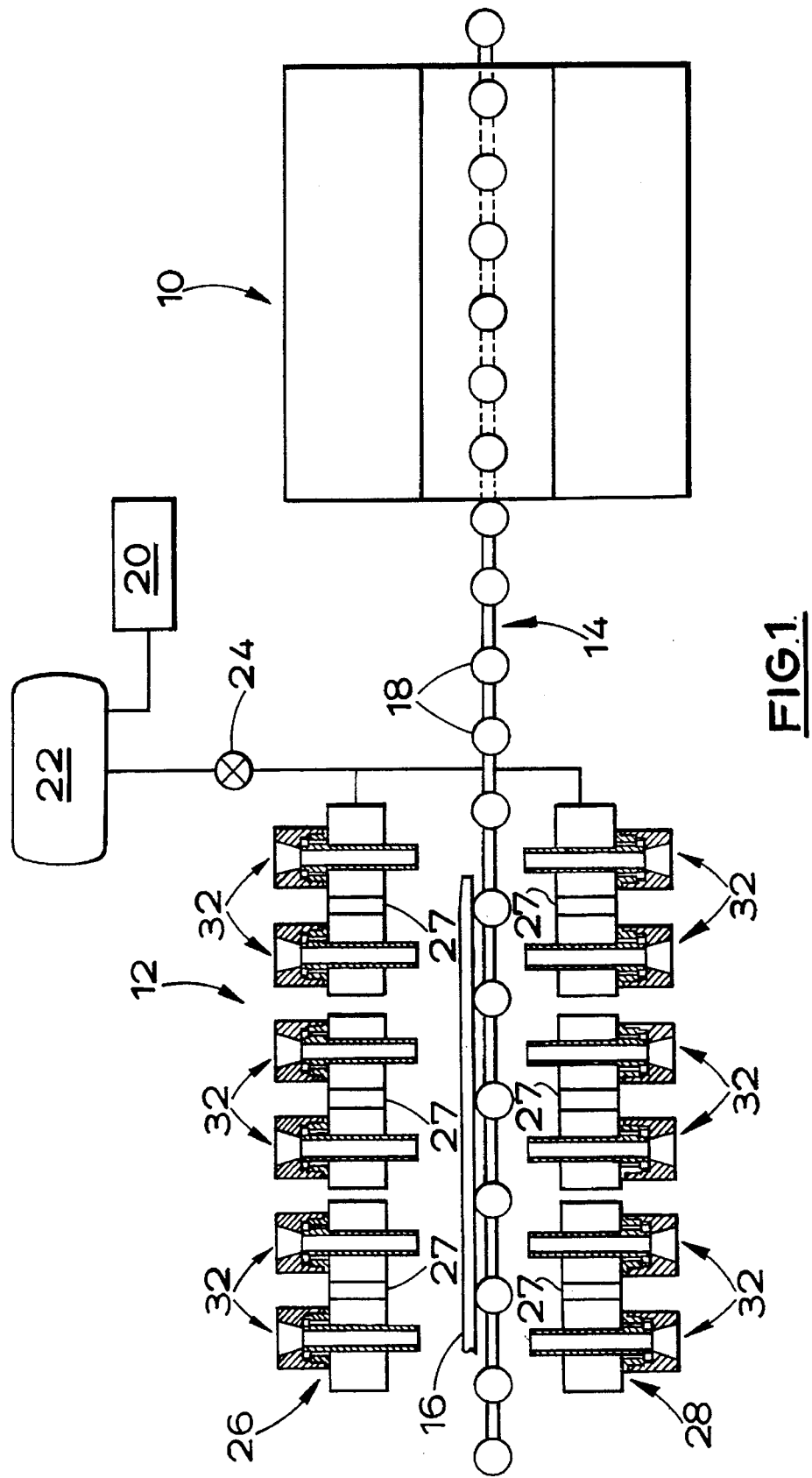
FIG. 1 is a schematic cross-section of heat treatment apparatus embodying the invention.
Figure 2:
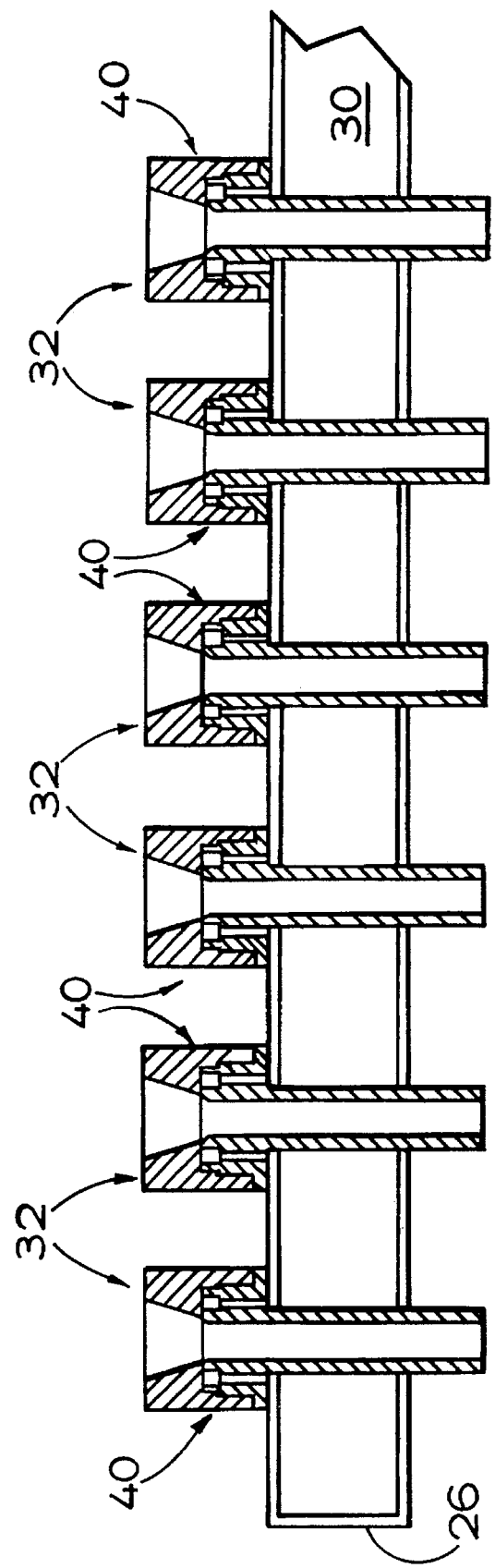
FIG. 2 is a cross-section of a plurality of air ejectors mounted on a manifold being comprised within the apparatus of FIG. 1.
Figure 3:
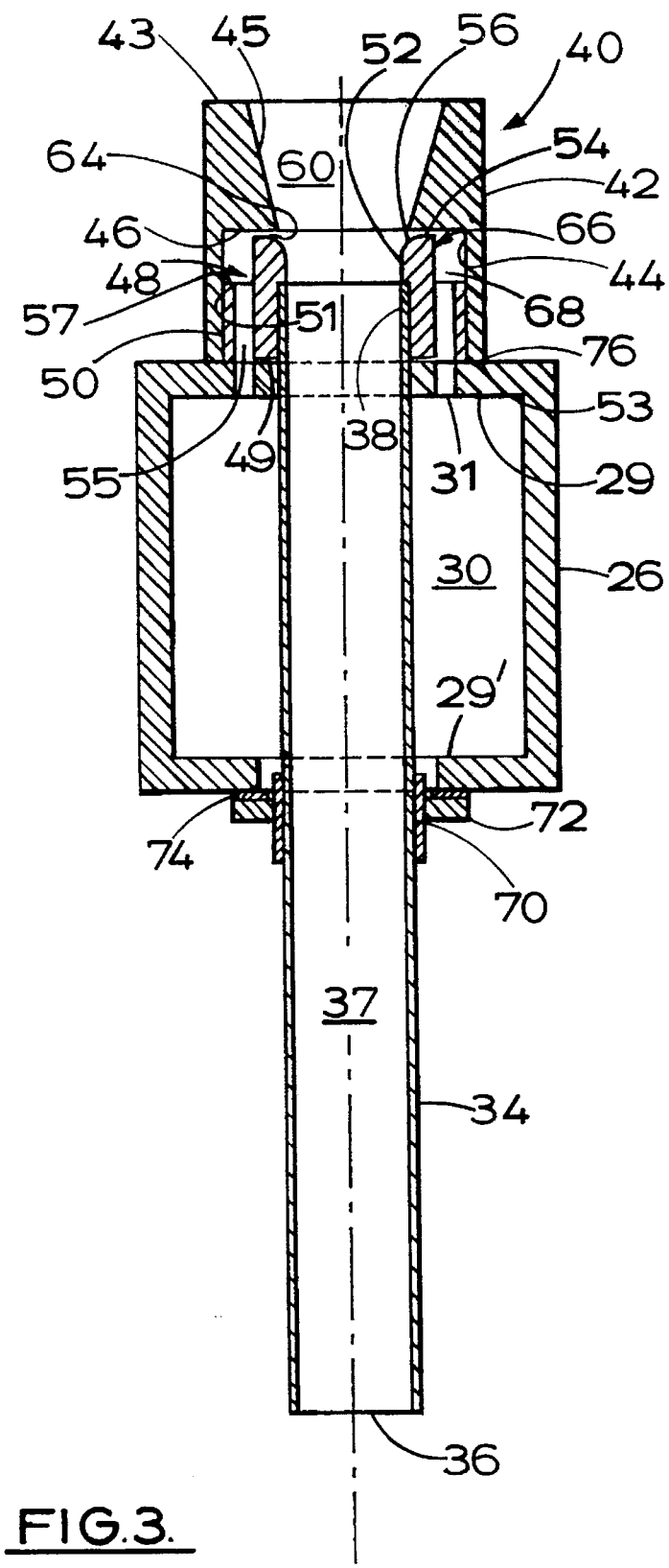
FIG. 3 is a detailed cross-section of an air ejector shown in FIG. 2.

A heat treatment apparatus comprises a heating furnace 10, quenching apparatus 12, and a conveyor 14 for conveying a sheet of glass 16 into the furnace 10 and from the furnace to the quenching apparatus 12.

The furnace 10, the purpose of which is to heat the sheet of glass uniformly to its transition temperature, may be of conventional design and will not be further described herein as many possible constructions will be known to those skilled in the art.

The conveyor 14 may also be of conventional form and will typically comprise a multiplicity of spaced-apart rollers with parallel, coplanar axes 18 on which the sheet of glass 16 is supported. The conveyor 14 also comprises a drive means (not shown) operatively coupled to the rollers 18 for rotation thereof so as to cause linear movement of the sheet of glass 16 supported thereon. Operation of the drive means and of other components of the heat treatment apparatus is controlled by a control unit (not shown).

The quenching apparatus 12 comprises a source of compressed air which includes a compressor 20 and a plurality of air receivers 22. Compressed air is fed from the compressor 20 to the air receivers 22 where it is stored until required. Filtering and drying means (not shown) are further provided to filter and dry the air prior to its storage in the air receivers 22.

The maximum pressure of air within the receivers 22 will be dependent upon the particular components used in constructing the quenching apparatus 12. It will typically be in the range of 7 to 15 bar.

The air receivers 22 are pneumatically connected to an inlet of a flow-control valve 24. The flow-control valve 24 is adapted for automatic control by the control means. An outlet of the flow-control valve 24 is pneumatically connected to upper and lower arrays of manifolds 26,28 to be described below. The flow-control valve 24 together with its pneumatic connections constitute air distribution means of the apparatus. In some embodiments, a pressure transducer may be mounted in at least one of the manifolds to provide to the control unit a signal representative of the air pressure within the manifold.

Each manifold 26,28 comprises an elongate metal, rectangular box section having a closed end and a hollow interior 30 into which air from the flow-control valve 24 is received. The manifolds 26, 28 are arranged in pairs, the members of each past being interconnected by a short box section 27. The manifolds 26,28 of each array are arranged parallel and spaced apart. The manifolds 26,28 are disposed transverse to the linear movement of the sheet of glass 16 caused by the conveyor 14, and parallel to the plane of the sheet 16. The length of the manifolds 26,28 and the number thereof in each array are selected such that a sheet of glass 16 to be quenched while in the quenching apparatus 12 may be substantially covered by the manifolds 26,28.

The upper and lower arrays of manifolds 26,28 are disposed, respectively, above and below the plane of a sheet of glass 16 supported on the conveyor 14, and may be mounted such that their distance from the sheet of glass 10 may be varied.

Each manifold 26,28 carries a plurality of air ejectors 32 evenly spaced apart along its length typically at a pitch of 40–60 mm. The air ejectors 32 on the two manifolds constituting a pair are staggered from one another. Each air ejector 32 constitutes an air amplification means, being operative to receive air from the manifold 26,28 on which it is mounted and to generate a stream of cooling air of volume greater than that received from the manifold 26,28. The air ejectors 32 on at least the lower manifold 28 are arranged such that their stream of cooling air is directed between the rollers 18 of the conveyor 14.

Each air ejector comprises a hollow cylindrical nozzle 34, an open end of which constitutes an air outlet 36, and a hollow body of which constitutes an air passage 37. The nozzle 34 extends through the manifold 26,28 on which it is mounted, apertures being provided on opposite walls 29 29' of the manifold 26,28 through which the nozzle 34 passes. The nozzle 34 is mounted such that approximately half of its length and its air outlet 36 project from the manifold 26,28 towards the conveyor 14. A short head portion 38 of the nozzle 34 projects from the manifold 26,28 away from the conveyor.

A cap assembly 40 of the air ejector 32 surrounds the head portion 38 and extends from the manifold 26,28 away from the conveyor beyond the end of the nozzle 34.

The cap assembly 40 comprises an outer part 42 of cylindrical cross-section. An inner end surface 53 of the outer part 42 is disposed close to the wall 27 of the manifold 26, the outer part 42 extending axially of the nozzle 34 therefrom.

The outer part 42 has an axial through bore. The through bore has a first region 44 which is cylindrical and bounded by an internally screw threaded wall. The first region 44 extends from approximately half way through the outer part 42, to the inner end surface 53 of the outer part 42. The through bore has a second region 45 which extends from an outer end face 43 the outer part 42 axially of the nozzle 34. The second region 45 tapers uniformly towards the manifold 26, and constitutes a cooling air passage 60. The air passage 60 is open to atmospheric air at the outer end surface 43. A transverse step 46 in the bore interconnects its first and second regions 44, 45.

The cap assembly 40 further comprises an inner part 48. The inner part 48 has a cylindrical body portion 50 having a threaded outer surface 57 in threaded engagement with the threaded wall of the first region 44 of the outer part 42, an outer end face 57 directed towards the transverse step 46 and an inner end face 49 disposed close to the mnifold 26. 0n assembly, a thread sealing medium is introduced onto the interengaging threads to effect an air-tight seal between the inner and outer parts 48, 42. A central circular through way extends axially through the body portion 50 and receives the head portion 38 of the nozzle 34 which is a close fit therein. The nozzle 34 is retained in place by adhesive bonding.

A jet-forming part 66 projects generally axially from the inner end face of the body portion 50 towards the transverse step 46 of the outer part 42. The jet-forming part 66 comprises a projecting circular rib arranged concentrically on the body portion 50. The jet-forming part 66 has a cylindrical outer surface and an inner surface. The inner surface has a first portion 52 promixal to the body portion which-surrounds the through way and is of diameter substantially equal to the internal diameter of the nozzle 34. Thus, the first portion of the inner surface defines an extension of the air passage 37 of the nozzle.

Remote from the nozzle 34, the inner surface has a planar, annular transverse portion 54 which is orientated transverse to the axis of the nozzle 34, these two sections 52,54 being interconnected by a conjoining portion 56 of arcuate or, more preferably, polygonal cross-section.

The transverse portion 54 of the inner surface of the jet-forming part 66 approaches closely (typically to within 0.05 to 0.125 mm) the transverse step 46 of the bore of the outer part 42, an annular jet 64 of uniform cross-section being defined therebetween. The distance between the two surfaces 46, 42 which define the jet 64 is controlled by mutual rotation of the inner and outer parts 48, 42 on assembly, this resulting in mutual axial movement by virtue of these two parts being in threaded interengagement. Once the required distance has been achieved, the thread sealing medium serves to resist further mutual rotation of the inner and outer parts 48, 42. Radially outwardly of the jet 64, the annular space bounded by the step 46 and the wall of the first region 44 of the bore in the outer part 42 and the outer end face 57 of the inner part 48 constitutes an expansion chamber 68.

A threaded collar 70 is fixed, for example by soldering, around the nozzle 34, a portion of the collar 70 passing through the aperture in the wall 29 of the manifold 26 remote from the cap 40. A nut 72 is screwed onto the collar 70 and tightened to bear on the wall 27' of the manifold 26. This applies tension to the nozzle 34 within the manifold 26 and causes the cap 40 to be urged into contact with the wall 27 of manifold 26. Sealing washers 74, 76 are disposed between the walls 27', 27 and, respectively, the nut 72 and the outer part 42 of the cap 40 to provide air-tight seals around the apertures in the walls 27, 27' of the manifold 26.

A plurality of circumferentially-spaced bores 55 are formed through the body portion 50 extending generally axially between its outer and inner end faces 48, 57. Through holes 31 are provided in the wall 27 of the manifold 26 in to allow air to pass between the manifold interior 30 and the bores 55. The bores 55 and the through holes 31 together constitute a high-pressure airway.

In use, air from the hollow interior 30 of the manifold 26,28 enters the high pressure airway and, from there, the expansion chamber 68. From the expansion chamber 68, air flows radially inwardly through the jet 64 at high subsonic speed. Action of the Coanda effect causes this flow of air to curve as it passes across the conjoining portion 56 such that it is directed into the air passage 37 of the nozzle 34. The flow from the jet 64 entrains a flow of air of larger volume through the air passage 60 into the air passage 37 of the nozzle. Thus, the flow of high pressure air into the air ejector 32 form the manifold 26,28 is amplified, resulting in a large flow of air from the air outlet 36.

The operation of the glass toughening apparatus will now be described.

A sheet of glass 16 is placed on the conveyor 14 which, under the control of the control means, transports it into the furnace 10 wherein it remains Until it is heated uniformly to its transition oscillates in furnace temperature. During heating, the compressor 20 is running and pumping air into the air receiver 22, the control valve 24 being closed.

Once the sheet of glass 16 attains the required temperature, the control means re-starts the conveyor 14 to transport the sheet of glass 16 into the quenching apparatus 12. While the sheet of glass 16 is within the quenching apparatus, it is not held at rest: the conveyor 14 is controlled by the control means to drive the sheet of glass 16 cyclicly first in one direction then in the opposite direction to ensure that it is quenched evenly.

Immediately prior to the sheet of glass 16 entering the quenching apparatus 12, the control valve 24 is opened, allowing high-pressure air to flow from the air receivers 22 into the manifolds 26,28 and thence to the air ejectors 32. Each air ejector 32 then operates to amplify this flow of air as described above so causing a large volume of cooling air to be directed onto the sheet of glass 16 to carry out quenching thereof.

During quenching, the pressure of the air in the air receiver 22 will fall as air is exhausted therefrom. The flow control valve 24 is therefore adjusted during quenching of the glass 16 to maintain, as far as possible, a constant pressure in the manifolds 26,28. This may be done in accordance with a pre-determined program or may be in response to signals received by the control unit from an air pressure transducer.

Typically one or more rows of air ejectors 32 close to the furnace 10 are set to produce a greater flow of air than the remaining ejectors. This ensures a rapid initial cooking of the glass 16 as it enters the quenching apparatus.

I claim:

1. Apparatus for quenching a sheet of glass undergoing heat treatment comprising an array of air ejectors forming quench nozzles which in use direct jets of air at the surface of the glass, the ejectors each comprise a main nozzle inlet, a throat and nozzle outlet, an annular slot around an inlet region of the throat being arranged to receive a relatively small flow of high pressure motivating air from a source of compressed air whereby to cause ambient air to become entrained into said main nozzle inlet and a relatively large flow of high velocity air thereby to be discharged through the nozzle outlet on to the glass.

2. Apparatus according to claim 1 in which the ejectors are arranged to receive the high pressure air from a pressurized air receiver.

3. Apparatus according to claim 2 comprising a flow control valve whereby the discharge of high pressure air from the air receiver to the ejectors can be regulated.

4. Apparatus according to claim 3 in which the high pressure air is supplied to the ejectors from the receiver by way of a manifold, the flow control valve being adjustable to maintain a selected pressure in the manifold as the pressure in the receiver decays.

5. Apparatus according to claim 4 in which the ejectors are mounted on the manifold with nozzle stems of the ejectors extending through the manifold, whereby ambient air is drawn into the ejectors from one side of the manifold and discharged from the nozzles at an opposite side of the manifold.

6. Apparatus according to claim 4 in which compressed air is supplied to the ejectors from the manifold at a pressure of between 2.5 and 6 bar.

7. Apparatus according to claim 1 in which the nozzles are arranged in an array at a pitch of between 40 mm and 60 mm.

8. Apparatus according to claim 1 having two arrays of air amplifiers, each arranged to direct air onto a respective surface of the sheet of glass.

9. Apparatus according to claim 1 in which the air ejectors are individually adjustable.

* * * * *